(12) United States Patent
Witzel et al.

(10) Patent No.: US 9,544,338 B2
(45) Date of Patent: *Jan. 10, 2017

(54) CALL HANDLING FOR IMS REGISTERED USER

(71) Applicant: TELEFONAKTIEBOLAGET L M ERICSSON (PUBL), Stockholm (SE)

(72) Inventors: Andreas Witzel, Herzogenrath (DE); Ralf Keller, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,275

(22) Filed: Sep. 16, 2014

(65) Prior Publication Data

US 2015/0009987 A1    Jan. 8, 2015

Related U.S. Application Data

(63) Continuation of application No. 13/085,845, filed on Apr. 13, 2011, now Pat. No. 8,855,105, which is a continuation of application No. 12/095,738, filed as application No. PCT/EP2005/012788 on Dec. 1, 2005, now Pat. No. 8,542,672.

(51) Int. Cl.
*H04L 29/06*     (2006.01)

(52) U.S. Cl.
CPC .......... *H04L 65/103* (2013.01); *H04L 65/104* (2013.01); *H04L 65/1016* (2013.01); *H04L 65/1069* (2013.01)

(58) Field of Classification Search
CPC .................................................... H04L 65/103
USPC ............... 370/352, 338, 401, 349, 354, 467, 328,370/331, 356, 395.2, 410; 455/414.1, 432.1, 455/445, 560
See application file for complete search history.

(56) References Cited

U.S. PATENT DOCUMENTS

5,526,400 A * 6/1996 Nguyen ..................... 455/432.2
6,035,198 A   3/2000 Wiehe
6,097,963 A * 8/2000 Boltz et al. .................. 455/518
(Continued)

FOREIGN PATENT DOCUMENTS

EP    1257139 A1    11/2002
JP    2001053725 A   2/2001
(Continued)

OTHER PUBLICATIONS

ETSI TS 129 163 V6.6.0 Digital cellular telecommunications system (Phase 2+); Universal Mobile Telecommunications System (UMTS); Interworking between the IP Multimedia (IM) Core Network (CN) subsystem and Circuite Switched (CS) networks; (3GPP TS 29.163 V6.6.0 Release 6), Mar. 2005.
(Continued)

*Primary Examiner* — Parth Patel

(57) ABSTRACT

The present invention proposes a solution for providing IMS services to users having circuit-switched controlled terminals. In particular, it is proposed, in order to allow IMS to take the full call and service control, to combine circuit-switched and packet-based multimedia functionality in a new node type called Mobile Access Gateway Control Function (MAGCF). In particular the present invention provides a method for ensuring that the MAGCF node acts as a roaming anchor point in order to enforce the handling of originating and terminating calls in the IMS.

17 Claims, 7 Drawing Sheets

(56) References Cited

U.S. PATENT DOCUMENTS

Figure 1:
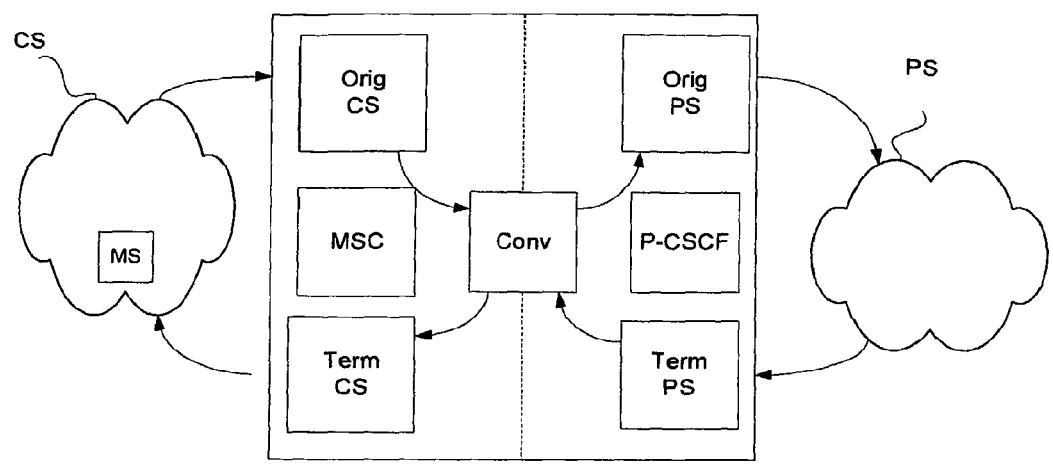

| | | | |
|---|---|---|---|
| 6,219,546 B1* | 4/2001 | Valentine et al. | 455/428 |
| 6,615,037 B1 | 9/2003 | Bharatia et al. | |
| 6,741,695 B1 | 5/2004 | McConnell | |
| 6,757,266 B1* | 6/2004 | Hundscheidt | H04L 12/2856 370/328 |
| 6,839,421 B2* | 1/2005 | Ferraro Esparza et al. | 379/220.01 |
| 6,876,634 B1* | 4/2005 | Lim | H04W 84/042 370/310.1 |
| 6,904,035 B2* | 6/2005 | Requena | 370/338 |
| 6,961,774 B1* | 11/2005 | Shannon | H04W 36/0066 455/436 |
| 6,996,087 B2* | 2/2006 | Ejzak | 370/338 |
| 7,031,747 B2* | 4/2006 | Cyr et al. | 455/552.1 |
| 7,082,307 B2 | 7/2006 | Zhou et al. | |
| 7,450,565 B2* | 11/2008 | Suotula et al. | 370/352 |
| 8,542,672 B2* | 9/2013 | Witzel et al. | 370/352 |
| 2001/0030954 A1* | 10/2001 | Hameleers et al. | 370/338 |
| 2001/0049795 A1* | 12/2001 | Elgressy et al. | 713/200 |
| 2002/0024943 A1* | 2/2002 | Karaul et al. | 370/338 |
| 2002/0072362 A1* | 6/2002 | Garland et al. | 455/432 |
| 2002/0075846 A1* | 6/2002 | Valentine et al. | 370/352 |
| 2002/0110104 A1* | 8/2002 | Surdila et al. | 370/338 |
| 2002/0141358 A1 | 10/2002 | Requena | |
| 2003/0027569 A1* | 2/2003 | Ejzak | 455/432 |
| 2003/0027595 A1* | 2/2003 | Ejzak | 455/560 |
| 2003/0032432 A1* | 2/2003 | Red et al. | 455/445 |
| 2003/0117999 A1 | 6/2003 | Abrams et al. | |
| 2003/0179720 A1* | 9/2003 | Cuny | H04L 47/14 370/310 |
| 2004/0003092 A1* | 1/2004 | Lehto | H04Q 3/0062 709/227 |
| 2004/0228324 A1* | 11/2004 | Alexiou et al. | 370/352 |
| 2004/0229601 A1* | 11/2004 | Zabawskyj et al. | 455/417 |
| 2004/0229608 A1 | 11/2004 | Isukapalli et al. | |
| 2004/0242227 A1* | 12/2004 | Huotari et al. | 455/432.1 |
| 2005/0002407 A1* | 1/2005 | Shaheen | H04L 12/5835 370/401 |
| 2005/0058125 A1* | 3/2005 | Mutikainen et al. | 370/354 |
| 2005/0083909 A1 | 4/2005 | Kuusinen et al. | |
| 2005/0141528 A1* | 6/2005 | Matsuhashi et al. | 370/401 |
| 2005/0195762 A1* | 9/2005 | Longoni et al. | 370/328 |
| 2005/0261021 A1 | 11/2005 | Hallenstal et al. | |
| 2005/0286531 A1* | 12/2005 | Tuohino et al. | 370/395.2 |
| 2006/0023657 A1* | 2/2006 | Woodson et al. | 370/328 |
| 2006/0073841 A1* | 4/2006 | Narasimha | H04W 68/12 455/458 |
| 2006/0079228 A1* | 4/2006 | Marsico et al. | 455/433 |
| 2006/0142010 A1 | 6/2006 | Tom et al. | |
| 2006/0142011 A1 | 6/2006 | Kallio | |
| 2006/0198334 A1* | 9/2006 | Civanlar | H04L 29/06027 370/328 |
| 2006/0206504 A1* | 9/2006 | Cai et al. | 707/100 |
| 2006/0280169 A1 | 12/2006 | Mahdi | |
| 2006/0291418 A1 | 12/2006 | Singh | |
| 2007/0153766 A1* | 7/2007 | Bienn | H04M 3/42 370/352 |
| 2007/0207784 A1* | 9/2007 | Ewert et al. | 455/414.1 |
| 2007/0248079 A1* | 10/2007 | Jayaram et al. | 370/352 |
| 2007/0280162 A1* | 12/2007 | Deshpande et al. | 370/331 |
| 2009/0034511 A1 | 2/2009 | Hundscheidt et al. | |
| 2010/0017521 A1* | 1/2010 | Ying et al. | 709/227 |

FOREIGN PATENT DOCUMENTS

| | | |
|---|---|---|
| JP | 2004088532 A | 3/2004 |
| JP | 2004530333 A | 9/2004 |
| JP | 2005006328 A | 1/2005 |

OTHER PUBLICATIONS

Oxley, et al., Techniques to Support VoIP Using WAP in a 2G and GPRS in 2.5G Networks, ip.com Journal, Feb. 22, 2002.

* cited by examiner

CALL HANDLING FOR IMS REGISTERED USER

CROSS-REFERENCE TO RELATED APPLICATIONS

This application is a Continuation of U.S. application Ser. No. 13/085,845, filed Apr. 13, 2011, which is a Continuation of U.S. application Ser. No. 12/095,738, filed Nov. 19, 2009, which was the National Stage of International Application No. PCT/EP2005/012788, filed Dec. 1, 2005, the disclosures of which are incorporated herein by reference.

TECHNICAL FIELD OF THE INVENTION

The present invention relates to performing call handling for a user having circuited-switched controlled user's equipment and being ported to a IMS domain.

BACKGROUND

Third Generation (3G) Networks such as UMTS (Universal Telecommunication Network) and CDMA 2000 provide high-speed wireless Internet access to mobile users over a wide coverage area. For the 3G networks the IP Multimedia Subsystem IMS has been defined to provide cellular access to the services of the Internet in order to support telephony and multimedia services. The IMS uses packet-switched technology, in particular IP-network and other IETF protocols for provision of services. The 2nd Generation networks, like GSM, provide voice based on a circuit-switched technology. The strength of IMS is the provision of enhanced Services, for example multimedia services combining voice and data. Further, the usage of IP-network as a single underlying standard allows an easy and fast service deployment.

A Session Initiation Protocol SIP has been chosen in IMS for signalling between the user's equipment UE and the IMS as well as between the components within the IMS. The IMS uses SIP also to complete voice and multimedia calls in the Internet. In order to be able to use the IMS service, the communicating user's equipment has to support IMS, which means SIP has to be implemented in the user's equipment.

In the following simplified network architectures of IMS is described. In particular the nodes being involved in provision of service in IMS architecture are mentioned.

The components of the IMS system are the Call Session Control Function (CSCF), the Media Gateway (MGW)/Media Gateway Control Function (MGCF), the Home Subscriber Register (HSR), the Application Server (AS).

The CSCF acts as a call server and handles call signalling, it supports and controls multimedia sessions and performs address translation functions. The CSCF can be functionally decomposed to S-CSCF, I-CSCF and P-CSCF. The Proxy-CSCF (P-CSCF) is the first contact point in a IMS network and it provides authorization of bearer resources, further it forwards a SIP register request received from the User Equipment UE to an I-CSCF determined using the home domain name, as provided by the user. In the opposite direction it forwards the SIP request or response to the UE. Moreover the CSCF forwards SIP messages received from the UE to a SIP server (S-CSCF) whose name the P-CSCF has received as a result of the registration procedure.

The Interrogating-CSCF (I-CSCF) is the contact point within an operator's network for all connections destined to a subscriber of that network operator, or a roaming user currently located within that network operator's service area. There may be multiple I-CSCFs within an operator's network. The main function performed by the I-CSCF is assigning a S-CSCF to a user performing SIP registration.

The Serving Call Session Control Function (S-CSCF) is the node that performs the session management for the IMS network. There can be several S-CSCFs in the network. The main functions of S-CSCF comprise: acceptation of registration requests from UE, interacting with services platforms for the support of services. Further it provides endpoints with service event related information (like for example notification of tones/announcement together with location of additional media resources, billing notification).

The Home Subscriber Register HSR is the centralized subscriber database. The HSR interfaces with the I-CSCF and the S-CSCF to provide information about the location of the subscriber and the subscriber's subscription information. The HSR is responsible for holding the following user related information: user identification, numbering and addressing information, user security information for authentication and authorization. The HSR supports the user registration, and stores inter-system location information.

The IMS supports several nodes for inter-working with legacy networks, like for example Media Gateway Control Function (MGCF).

The MGCF performs protocol conversion between cellular call control protocols and IMS protocols. For example, the MGCF receives a SIP message from the CSCF and converts it into appropriate ISUP messages. Thus, the primary function of MGCF is to convert signalling information from one format to another in uplink and downlink direction. In UMTS this will predominantly be between Pulse Code Modulation (PCM) in the PSTN and an IP based format.

The IMS Access Server hosts and executes services, the user requested for.

As already mentioned the UMTS system allows mobiles operating in packet mode to establish voice calls using SIP as the signalling protocol. The SIP messages are sent to communicate the request to the Call Session Control Function (CSCF) in the IMS. In this case, the data is transmitted as packets throughout the UMTS network.

Thus, the IMS has been deployed for the 3G networks for provision of services using packet-switched technology with SIP as applied signalling protocol. However, currently the major numbers of user's equipment do not support IMS technology with SIP as signalling protocol for voice service, since said user's equipment is adapted for a circuit-switched controlled domain. Thus, for the access to the IMS an adaptation of the user's equipment is necessary, which leads to the problem of exchanging the end terminals.

Further problem which occurs is the provision of conversational services. In the IMS real time bearers are provided, which are not possible efficiently for voice services. For efficiently providing a speech service via GSM or WCDMA access, the circuit switched access is to be used.

SUMMARY AND DESCRIPTION OF THE INVENTION

Therefore, it is an object of the present invention to provide a solution for providing packet-switched multimedia services to user's equipment operating in circuit-switched controlled domain.

The invention is disclosed in the independent claims.

Advantageous embodiments are described in the dependent claims being disclosed in the corresponding parts of the description.

The invention discloses Access Gateway Node (MAGCF) adapted to handle a call in a packet-based multimedia system domain for a circuit-switched controlled user's terminal located in circuit-switched controlled domain wherein said Access Gateway Node comprises an originating circuit-switched logic adapted to receive an originating circuit-switched call either directly from the circuit-switched controlled user's terminal or from a serving mobile circuit-switched function serving mobile circuit-switched function by means of a routing number being used to route the circuit-switched call to the Access Gateway Node. Furthermore the Access Gateway Node comprises an originating packet-based multimedia logic adapted to send an originating packet-based multimedia call via an proxy call control function being part of the Access Gateway Node towards the packet-based multimedia domain. Furthermore terminating call functionality is included comprising a terminating packet-based multimedia logic adapted to receive from the packet-based multimedia domain a terminating packet-based multimedia call being addressed to the proxy call control function and a terminating circuit-switched logic adapted to send a terminating circuit-switched call towards the circuit-switched controlled user's terminal. Furthermore there is also a conversion function adapted to convert the originating circuit-switched call into the originating packet-based multimedia call and the terminating packet-based multimedia call into the terminating circuit-switched call.

Further the present invention discloses a method for handling a call in a packet-based multimedia domain for a circuit-switched controlled user's terminal located in circuit-switched controlled domain. Said method comprises the following steps Performing call originating procedure comprising
Receiving an originating circuit-switched call either directly from the circuit-switched controlled user's terminal or from a serving mobile circuit-switched function by means of a routing number being used to route the circuit-switched call to the Access Gateway Node (MAGCF) and,
Converting the originating circuit-switched call into an originating packet-based multimedia call and,
Sending the originating packet-based multimedia call via an integrated proxy call control function towards the packet-based multimedia domain and,
Performing call terminating procedure comprising
Receiving from the packet-based multimedia domain a terminating packet-based multimedia call being addressed to the integrated proxy call control function, and
Converting the terminating packet-based multimedia call into a terminating circuit-switched call and,
Sending the terminating circuit-switched call towards the circuit-switched controlled user's terminal.

Further advantageous embodiments are described in the dependent claims.

Figure 2:
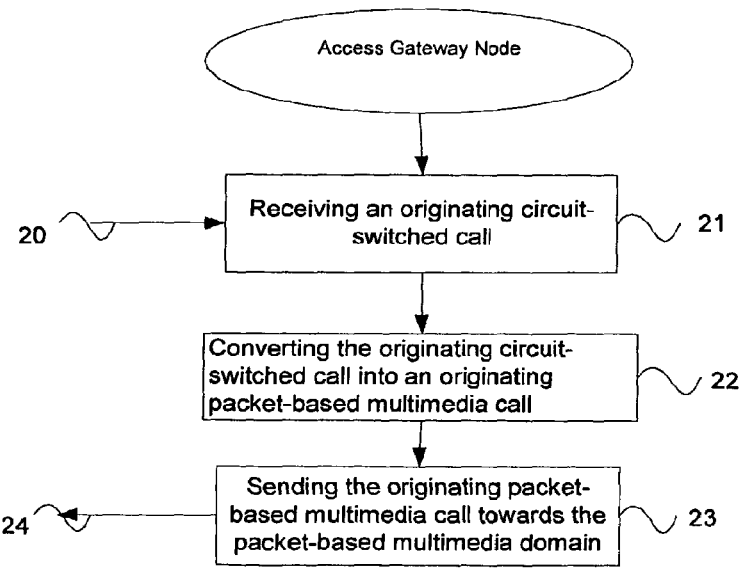
Figure 3:
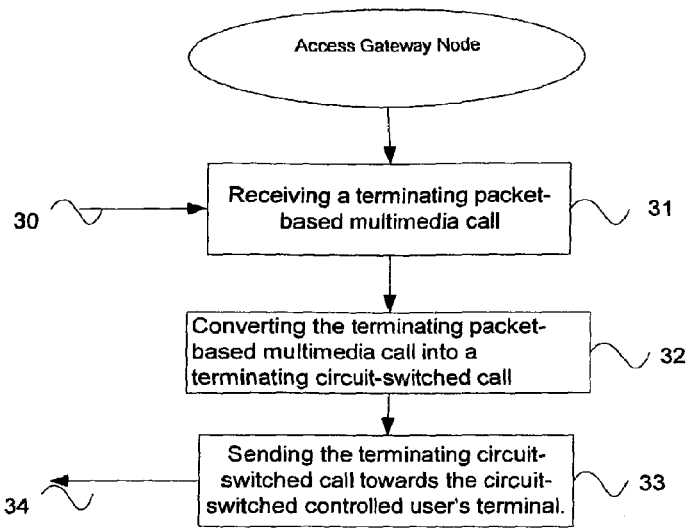
Figure 4:
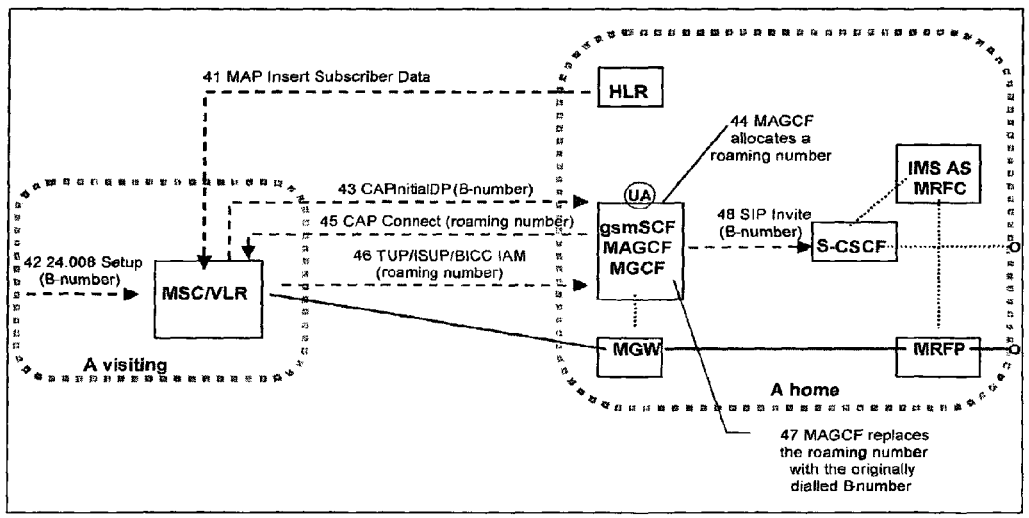
Figure 5:
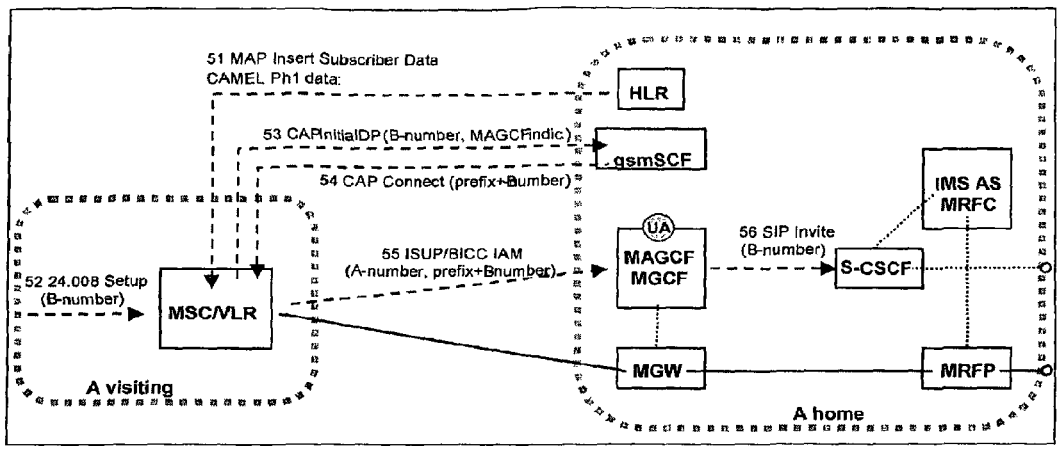
Figure 6:
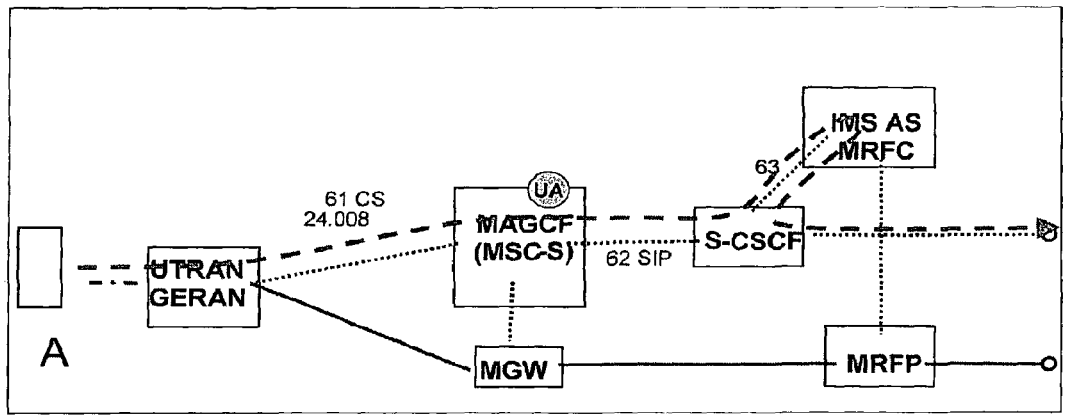
Figure 7:
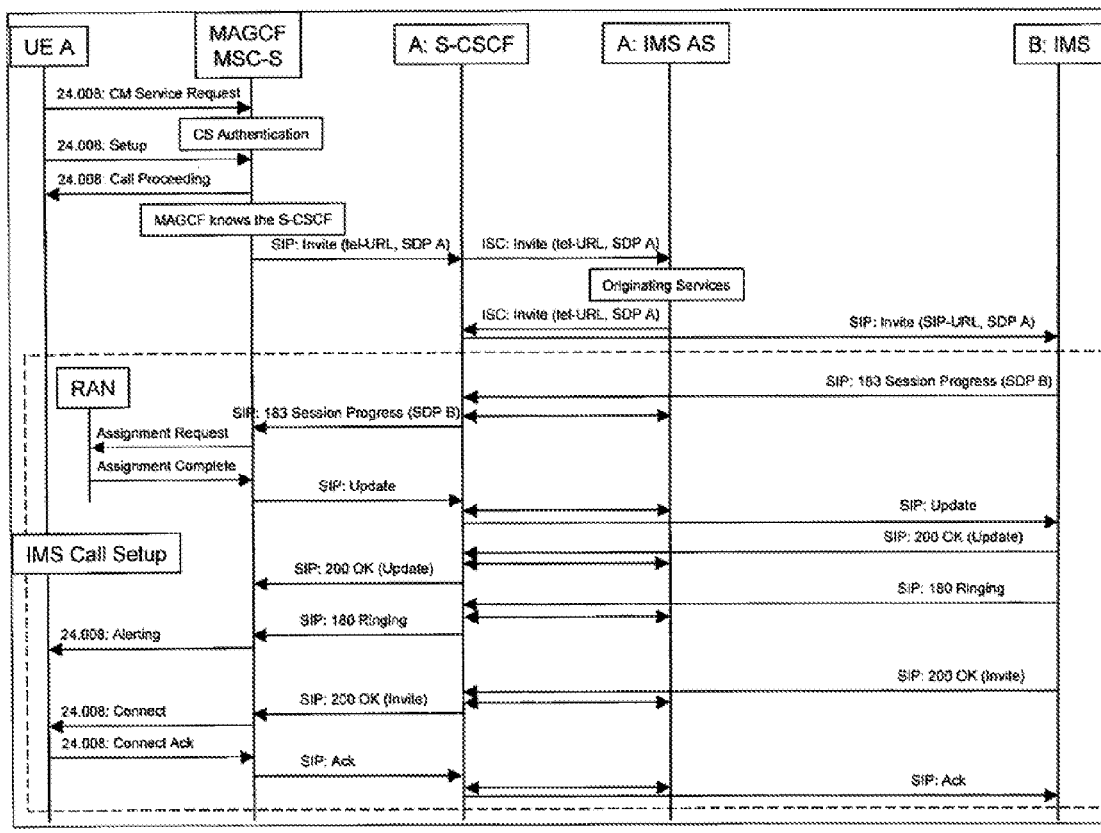
Figure 8:
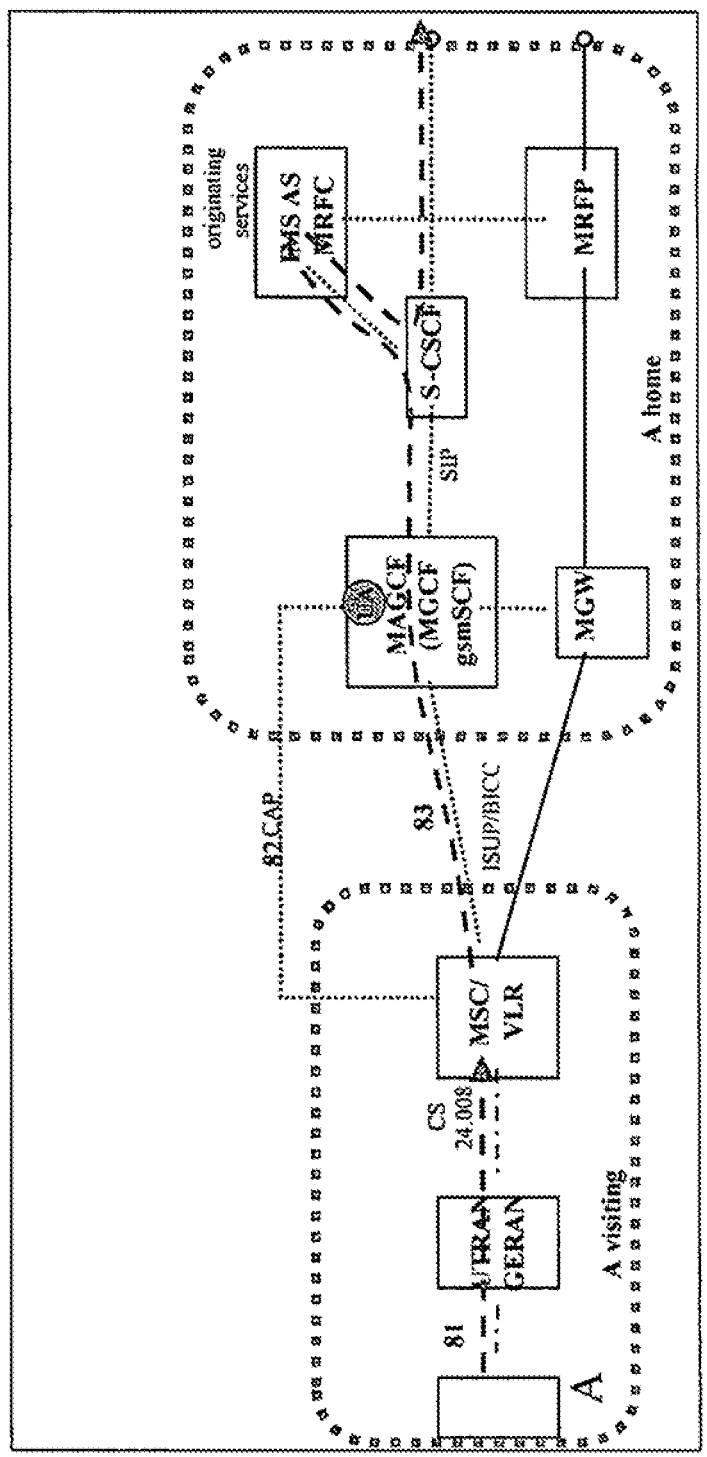
Figure 9:
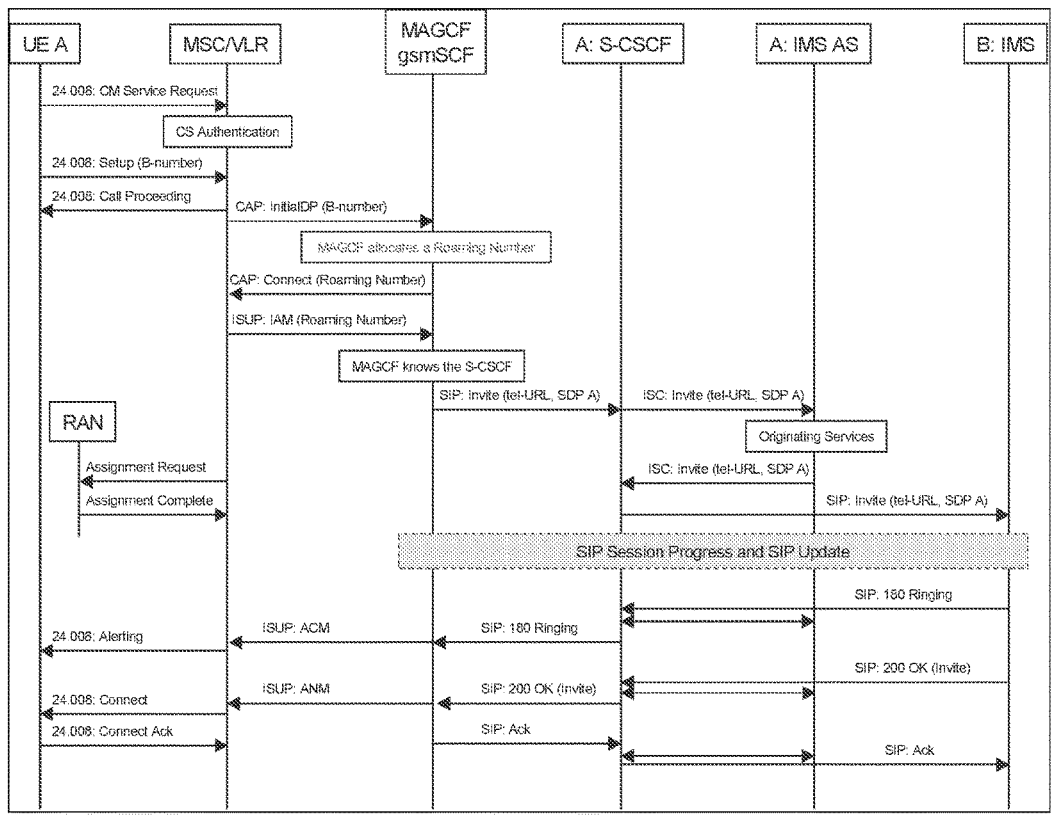
Figure 10:
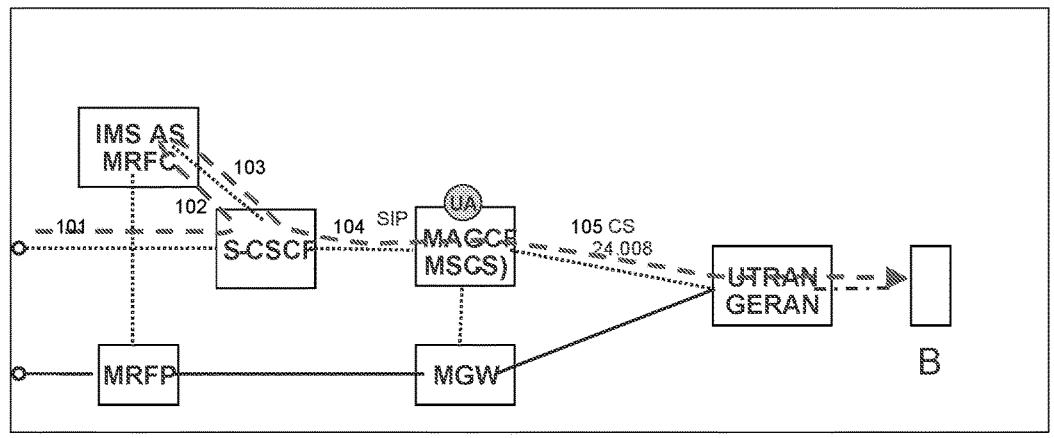
Figure 11:
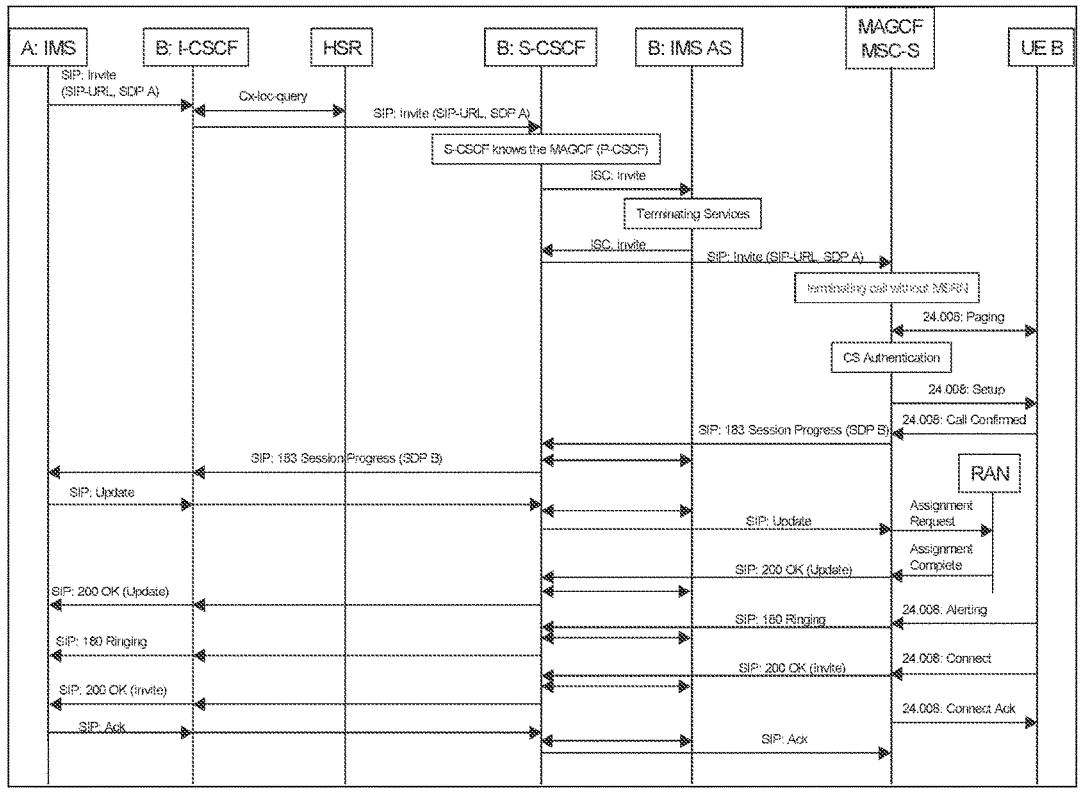
Figure 12:
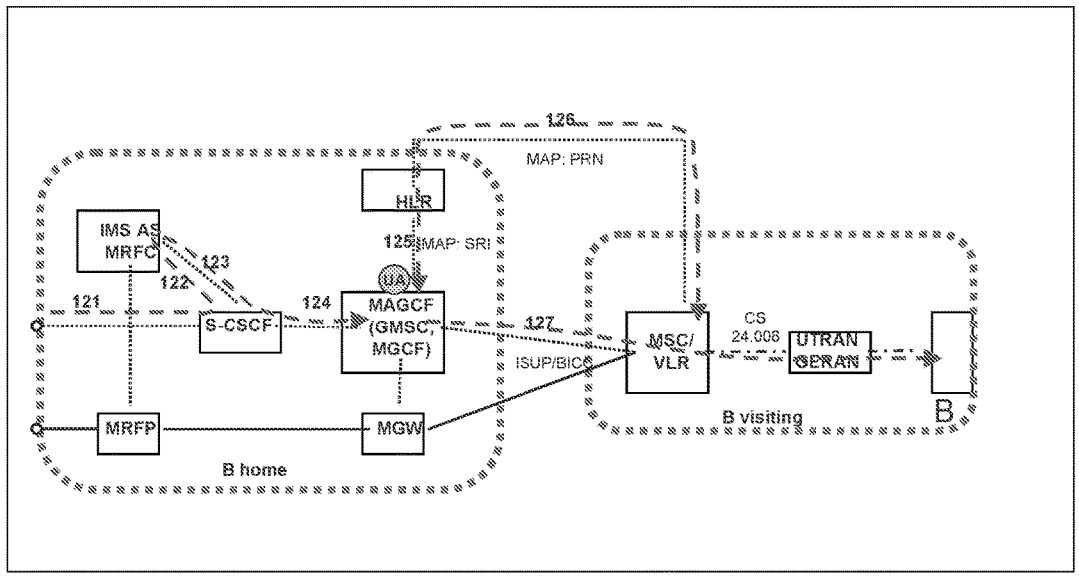

In the following preferred examples of the present invention shall be described in detail, in order to provide the skilled person with thorough and complete understanding of the invention, but these detailed embodiments only serve as examples of the invention and are not intended to be limiting. The following description shall make reference to the enclosed drawings, in which FIG. 1 shows a schematic representation of an architecture of Access Gateway Node according to the present invention, and FIG. 2 shows a flowchart of an embodiment of the present invention for call originating method being to be performed on the Access Gateway Node, FIG. 3 shows a flowchart of an embodiment of the present invention for call terminating method being to be performed on the Access Gateway Node, FIG. 4 shows an embodiment of the present invention for involving MAGCF as a roaming anchor point, FIG. 5 shows a further embodiment of the present invention for involving MAGCF as a roaming anchor point, FIG. 6 shows a schematic embodiment for call originating in home network, FIG. 7 shows an embodiment of a signalling sequence for call originating in home network, FIG. 8 shows a schematic embodiment for call originating in visited network, FIG. 9 shows an embodiment of a signalling sequence for call originating in visited network, FIG. 10 shows a schematic embodiment for call termination in home network, FIG. 11 shows an embodiment of a signalling sequence for call terminating in home network, FIG. 12 shows a schematic embodiment for call termination in visited network.

It should be noted that the term "entity", "node", "module", "logic" in the context of the present invention refers to any suitable combination of hardware and software for providing a predetermined functionality in the communication network. In this way, said terms generally refers to a logical entity that can be spread out over several physical entities, but can also refer to a physical entity located in one physical location, if no explicit definition is given.

It should be noted that the term "user" in the context of the present invention refers to circuit-switched controlled user equipment, wherein said user equipment is a combination of hardware and software. However in the following description the terms "user" and "user terminal" should be seen as having the same meaning, if it is not stated differently.

Preferably, the communication network is a mobile communication network, e.g. is a wireless communication network operating according to GSM, GPRS (General Packet Switched Radio) or UMTS (Universal Mobile Telephone System) or any 3G system like for example EDGE, CDMA2000. And preferably the packet-switched multimedia domain is the IP multimedia Subsystem (IMS).

According to the present invention it is proposed, in order to allow IMS to take the full call and service control, to combine the logical functionality of a cellular switching center and the logical functionality of IMS in an Access Gateway Node, which is called in the following MAGCF. In particular it is proposed that this new MAGCF node comprises a serving circuit-switched functionality like for example MSC, or MSC-S being serving MSC for a roaming user, or a GMSC-S for terminating calls to a roaming user in a network without MAGCF functionality, and optionally gsmSCF for originating calls for a roaming user and further it is proposed that the MAGCF has packet-switched multimedia functionality which is in particular the proxy call control function, like for example the P-CSCF for forwarding SIP messages from the user to IMS and from IMS to the user. In general it might be said that the MAGCF handles in the packet-switched multimedia domain on behalf of the user with a circuited-switched terminal. Further it is proposed that the MGCF performs protocol conversion between cellular call control protocols and IMS protocols. The task of an integrated user agent is to fulfil the IMS functionality and to handle on behalf of the user.

The basic concept is to ensure that the MAGCF handles all originating and terminating calls or in other words, it is to be ensured that the MAGCF is the anchor point for the cellular access towards IMS.

The present invention concentrates on establishing and handling of user calls. However, before establishing a packet-switched multimedia session, the user needs to perform registration procedure in order to let the circuited-switched and the IMS domain know the location of said user. This registration is performed by means of the SIP protocol and the user agent being part of the MAGCF and handling on behalf of the user performs the registration.

In the following registration with MAGCF as an anchor point is described. For example an embodiment is given describing changing of a service MSC-S while roaming to a visited network. When roaming into a visited network without support for MAGCF, the last responsible MAGCF is kept as anchor point.

According to the present invention said MAGCF node has the MSC functionality, like MSC-S and the IMS functionality in form of user agent UA and an integrated P-CSCF. The MAGCF has therefore the capability to communicate with the HLR and with the IMS and at least one MAGCF is foreseen for a user in a home network. Usually in a network a number of MSCs is provided, wherein a MSC is responsible for users being located in location areas being assigned to the MSC. Changing of the responsible MSC due to user's movement implies initiation of the roaming procedure aiming to register the user in a new MSC and de-register from the old MSC by performing all the necessary updates in respect therewith in the corresponding nodes. After entering a new location area, the terminal sends a location update request to the new MSC. When receiving this message, the MSC identifies the subscriber to be new in its responsibility and therefore the HLR is contacted for updating the location information. Upon receiving the location update message the HLR informs the old MSC that the subscriber has roamed into a new MSC area. According to the present invention a user serving MSC might be either part of a MAGCF or in case a user roams in a visited network it might be a usual MSC located in said visited network and communicating with the circuited-switched part of the MAGCF. In both cases a message is sent from the HLR that the MSC does no longer serve the subscriber. In case a MSC is a part of MAGCF in this case the new MAGCF is assigned to the user, which results in changing the address of the serving MAGCF in the S-CSCF and it results also in storing an address of the S-CSCF in the MAGCF. In case the serving MSC is not a part of the MAGCF, for example it might occur when a user roams in a visited network, in this case the serving MSC might change but the MAGCF remains the same. In order to register to the IMS system, the HLR, when receiving a location update, checks whether the MSC is a part of a MAGCF or not. Further the HLR checks the requesting subscriber. In order to provide the IMS functionality to the users, said users has to be ported to the IMS system. In other words, the user has to either announce actively the change to the IMS system or the system might decide to port cellular users to the IMS system. A corresponding notification about the user is to be stated in the HLR. In case a user is not ported, it is proposed to apply the standard behaviour for a cellular user like it is already known. In case the user is ported to the IMS, it is proposed that the HLR sends all the parameters, which are usually stored at the SIM card in the user's equipment to the MAGCF. Upon receipt of the parameters the user agent is contacted in order to register and to subscribe the subscriber in the IMS system. Preferably the applied protocol for the registration and for the subscription purpose is the SIP protocol, in this case also the user agent has SIP functionality implemented. During the IMS registration, the user agent acts on behalf of the subscriber. All steps necessary for registration are performed by the means of the IMS entities integrated in the MAGCF. The steps might include for example authentication of the user which is to be authenticate. However it is to be stated that the authentication is not mandatory because the solution might rely on the fact that the user has already been authenticated as part of the circuit-switched access and further it might be assumed that the MAGCF is connected to a trusted VPN. The result of the registration is that the MAGCF stores the S-CSCF address and following the IMS rules for registration, the S-CSCF stores the MAGCF address where the registered subscriber can be reached, preferably the P-CSCF address as integrated in the MAGCF is stored.

If a user roams in a visited network without MAGCF functionality then in case of roaming to a MSC, it is proposed that the current MAGCF stays responsible for the user. In case no MAGCF is assigned to the user yet then it is proposed to take a default MAGCF. Thus the location update procedure is restricted to updating an MSC in the HLR but not the responsible MAGCF as long as the user stays in the visited network.

After the registration is finished, a session establishment procedure including IMS Call setup procedure is initiated.

Thus, after a successful registration the MAGCF knows the S-CSCF and the S-CSCF has the MAGCF address, in particular the P-CSCF which functionality is part of the proposed MAGCF.

In the following a procedure is described according to the present invention how to enforce that the call handling is performed by a serving MAGCF. This situation might occur for example when roaming in a remote visited network, where no MAGCF functionality is available. In this case it is proposed to use the last serving MAGCF as roaming anchor.

The call handling procedure is described according to FIG. 1 presenting schematically a structure of a MAGCF being a anchor point between a circuited-switched CS network with a user's circuited-switched control terminal MS and a packet-switched multimedia network PS. There is an originating circuit-switched logic, Org CS, adapted to receive an originating circuit-switched call. Said call might be received directly from the circuit-switched controlled user's terminal in case the serving MSC is part of the MAGCF. This situation occurs when a user is in home network and it is defined that the serving MSC is included in the MAGCF. Alternatively the MAGCF might receive an originating call from a serving mobile circuit-switched function, which might be for example a MSC/VLR in a visited network handling the user. In this case the calling user contacts the MSC/VLR in a well known manner, using for example the B-number, and according to the present invention the MSC/VLR has to route the call to the MAGCF being responsible for the user. This is ensured by means of assigning a routing number. In the further description two methods for assigning a routing number are given; one is based on a roaming number assigned to a call and identifying in a unique manner the MAGCF, where the call is to be routed. For the purpose of assigning a number Intelligent Network IN-Functions are applied. In a second method the B-number is enhanced with a prefix, which defines how to route a B-number to the MAGCF. As it is also described in accordance with the both methods the routing number is assigned according to an indication about the Access Gateway Node serving the user received from a user's directory, like for example the HLR.

Independent whether the originating CS call is received directly from the user's terminal or via a MSC/VLR, in the next step the MAGCF converts the originating CS call in the conversion unit, Conv, into an originating packet-based multimedia call which is past to an originating packet-based multimedia logic Orig PS adapted to send the originating packet-based multimedia call towards the packet-based multimedia domain. According to the present invention it is proposed to have a proxy call control function P-CSCF being part of the Access Gateway Node. The Proxy-CSCF (P-CSCF) is the first contact point in a IMS network, it forwards a SIP messages received from the user to S-CSCF which name the P-CSCF has received as a result of the registration procedure. In the opposite direction it forwards the SIP request or response to the UE. Said P-CSCF is also used to reach the MAGCF for the call termination. Thus a terminating packet-based multimedia logic, Term PS, is proposed which is adapted to receive from the packet-based multimedia domain a terminating packet-based multimedia call. Said call is routed to the MAGCF by means of the address of the proxy call control function, P-CSCF. Said call is converted to a terminating circuit-switched call in conversion function, Conv, and sent towards the circuit-switched controlled user's terminal by means of a terminating circuit-switched logic, Term CS. The termination call might be either sent directly to the circuit-switched controlled user's terminal in case a serving circuit-switched node is part of the circuit-switched function or it is to be routed to the serving circuit-switched node in case said serving circuit-switched node is not a part of the circuit-switched function.

Further it is proposed that the MAGCF has a suppression function adapted to suppress the received originating circuited-switched call from handling in the circuit-switched domain. This ensures that the originating call is really handled in the IMS domain. In order to deliver the circuited-switched call to the user it is to be ensured that the received terminating packet-based multimedia call is terminated in the MAGCF.

In the following a method according to the present invention is described in respect to FIG. 2 and FIG. 3. FIG. 2 presents a call originating case. In the first step 21 the MAGCF receives an originating circuit-switched call. Said call might be either received directly from the circuit-switched controlled user's terminal, in case a serving mobile circuit-switched function, MSC, is integrated in the MAGCF. In case the user is handled by a separate serving mobile circuit-switched function, then the call is to be routed to the serving MAGCF by means of a routing number. The assignment of the routing number is described further. In step 22 the circuited-switched call is converted into an originating packet-based multimedia call and sent in step 23 towards the packet-based multimedia domain, 24. In the packet-switched multimedia part the proxy call control function P-CSCF is involved in the forwarding of the call.

FIG. 3 shows an embodiment for call termination. In step 31 a terminating packet-based multimedia call is received from the packet-based multimedia domain. The routing of the call is performed by means of a proxy call control function P-CSCF. In step 32 the call is converted into a terminating circuit-switched call and sent towards the circuit-switched controlled user's terminal, as described above either directly or via a serving MSC/VLR.

In the following embodiments of the present inventions are given.

In the following an embodiment is described showing an assignment of a routing number in case a user roams in a visited network and is served by a MSC/VLR being not a part of a serving MAGCF. In order to route all originating calls from the serving MSC/VLR to the roaming anchor MAGCF, a CAMEL mechanism as an example is used. The CAMEL approach is taken as an example and it has no restriction to the present invention.

In the following some essential features of a CAMEL network being used in one embodiment of the present invention are mentioned. CAMEL is a network feature which allows the network operator to provide the mobile subscribers with the operator specific services even when mobile subscribers are roaming outside the home network. According to CAMEL architecture, CAMEL Service Control Functionality (gsmSCF) functionality is to be provided in the subscriber's home PLMN, which contains the CAMEL service logic needed to implement operator specific services. Further there is also CAMEL Service Switching Functionality (gsmSSF) taking part in the transaction handling and executing the instructions given from the gsmSCF. Often used protocol for communication between nodes in the CAMEL architecture is the CAMEL Application Part (CAP) protocol. In the frame of CAMEL, a so called Trigger Detection Point (TDP) is defined, which specifies a point of time in transaction handling when the gsmSCF shall be contacted. When the TDP is met the gsmSSF opens a dialog to gsmSCF. There are a number of functionalities defined for the gsmSCF, among other things; the gsmSCF can be provided with information about ongoing transaction, like for example destination address and duration of transaction.

Returning to the embodiment of the present invention for ensuring that all calls are handled by a serving MAGCF, in the following two possible approaches for this purpose are presented. In the first solution a roaming number is used that is dynamically assigned to the call for routing from the serving MSC/VLR to the serving MAGCF, the second modifies the actually dialed B-number by adding a prefix to it.

The first approach is based on the concept of using a temporary roaming number. This solution is described in respect to FIG. 4.

In FIG. 4 a MSC/VLR is presented, which serves a user being located in its serving area, which is A visiting network. According to the present invention the MSC/VLR communicates with the MAGCF being located in the home network, A home, and comprising also gsmSCF functionality. Thus, the MAGCF provides connectivity to the circuit-switched domain. On the other hand the MAGCF provides signalling communication to the IMS and in particular to the S-CSCF. The S-CSCF is the user serving node in the IMS domain. It acts as a call server and handles call signalling. Further, according to FIG. 4 there is also the IMS AS which hosts and executes services, the user requested for. The AS is for example responsible for the call flows and user interface interactions with subscribers. The IMS AS delivers services to the IMS, such as push-to-talk, ringback tones, prepaid calling card, multimedia conferencing and multimedia messaging service logic. Further there is also a HLR being a user database located in the circuit-switched network.

According to the preferred embodiment of the present invention it is proposed to perform the transmission of user plane and of the user signalling on two independent layers. In the user plane, interworking elements are required to convert IP based media streams accordingly. The Media Gateway (MGW) node is responsible for this function. The Multimedia Resource Function Processor (MRFP) provides adjunct media processing for the application layer such as audio mixing, content recording and playback, codec transcoding, statistic obtaining and is connected to the MGW. The MRFP is not dedicated to a single application but provides media processing as a shared resource to a multitude of applications. The Media Resource Function Controller (MRFC) provides a media resource broker function between the AS and MRFP resources in the IMS, and can be implemented as part of an application server or as a separate network element.

According to FIG. 4 the flow of signaling information is depicted by means of a dotted line and the continuous line represent the flow of user plane.

In respect to FIG. 4 the following steps are proposed in order to deliver the call handling to the MAGCF.

When a user moves to a visited network, at first a location update procedure is to be performed in order to inform the HLR about the new location of the user. The communication between the MSC/VLR and HLR is realised by means of a MAP protocol. Thus, the HLR receives a MAP message for Update Location, the HLR determines whether the sending node supports MAGCF functionality. This can be achieved by including an indication from the sending node that MAGCF functionality is supported. Alternatively, the HLR can check in a predefined list administered in the HLR. If the HLR determines that MAGCF function is not supported by the node sending Update Location, it is proposed that the HLR adds CAMEL data to the data sent via MAP operation Insert Subscriber Data. This CAMEL data arms the CAMEL Trigger Detection Point for "Collect_Info", which indicates to the MSC/VLR to establish a connection to the gsmSCF, being responsible for the handling of user's call in the home network. As the address of the gsmSCF to be contacted, the HLR includes the address of the currently serving MAGCF, step 41. In case there is no serving MAGCF known in HLR, the HLR can use a predefined default MAGCF. As a result of the location procedure, the MSC/VLR has the contact address of MAGCF. In step 42 the MSC/VLR receives a call setup request including the called B-number. The CAMEL Trigger Detection Point "Collect_Info" is triggered immediately upon reception of the call request, which results that the MSC/VLR halts call setup processing and contacts the gsmSCF as addressed by the CAMEL subscription data received from HLR. The CAP message InitialDP is sent to the gsmSCF including the B-number. Since the HLR provided the address of the serving MAGCF as gsmSCF address, actually the MAGCF is contacted, step 43. In the subsequent step 44, the MAGCF allocates a temporary roaming number to be used to route calls to this MAGCF. The MAGCF stores the received B-number, so that it can later match the incoming roaming number call to the right B-number. In step 45 the MAGCF instructs the MSC/VLR to route the originating call to that roaming number. The CAP message Connect is sent from MAGCF to MSC/VLR. By means of the received roaming number, the serving MSC/VLR routes the hold call to the MAGCF, step 46. In step 47 the MAGCF receives the call, coming in with the roaming number. The MAGCF then looks up the originally dialed B-number, which was stored when allocating the roaming number. The B-number as called destination is used in step 48 to route the call to the S-CSCF being responsible for serving the A-subscriber for execution of originating services.

Thus, the described approach ensures that an originating call initiated in a visited network is forwarded to the MAGCF in order to be handled in the IMS domain. The call handling is described further.

In the following a second approach is presented for routing all originating calls to the MAGCF node being the roaming anchor point. The solution is based on the concept of using a prefix to the B-number and described in respect to FIG. 5. FIG. 5 comprises all nodes as disclosed in respect to FIG. 4 with the difference that the gsmSCF is depicted as a separate node. However this should not be seen as any restriction for the protection scope of the present invention. According to the present embodiment the gsmSCF is to be used as a database to add a specific prefix to the B-number, wherein the prefix needs to be specific for the selected MAGCF and preferably different prefixes are used for different selected MAGCF nodes. Thus, since the gsmSCF is a central point that adds the prefixes it is shown as a separate node, however the gsmSCF could be co-located with any other node. Returning to FIG. 5 Similar as in the first approach in step 51, the HLR determines whether a node sending a location update, supports MAGCF functionality. This determination might be performed by any preferably method, as it is disclosed in the first approach. If the HLR determines that MAGCF function is not supported by the node sending Update Location, the HLR sends the CAMEL Trigger Detection Point for "Collect_Info" with an indication, which MAGCF currently serves the user and an address of the serving gsmSCF, step 51. Alternatively no address of the serving gsmSCF is sent and in this case any gsmSCF in the home network can be contacted. As already mentioned, if there is no serving MAGCF known in HLR, the HLR can use a predefined default MAGCF. In step 52 a call setup request is received in the serving MSC/VLR carrying the called B-number. When receiving said request the CAMEL Trigger Detection Point "Collect_Info" is triggered immediately, which leads that the MSC/VLR halts call setup processing and contacts the gsmSCF as addressed by the CAMEL subscription data received from HLR. The CAP message InitialDP is sent to the gsmSCF including the B-number and the indication of the serving MAGCF, step 53. The gsmSCF recognizes from the received indication, which MAGCF is currently serving the subscriber. Then the gsmSCF adds a prefix to the B-number, which is specific for that serving MAGCF. Preferably, the prefixes are predefined in the gsmSCF. The gsmSCF then returns this modified B-number to the MSC/VLR and requests to continue call setup to this new number. The CAP message Connect is sent in step 54 from gsmSCF to MSC/VLR for this purpose. By means of the received prefixed B-number, the serving MSC/VLR routes the call to the MAGCF, step 55. The MAGCF receives the call coming in with the prefixed B-number and removes the prefix. It is to be mentioned, that preferably also the A-number is to be provided by the MSC/VLR, in order to allow the MAGCF to identify the right served subscriber. In step 56, the call is routed to the S-CSCF of the A-subscriber for execution of originating services. Here the B-number is again used as called destination.

Thus also the second approach ensures that all originating calls are provided to the MAGCF serving a user.

In both approaches, when roaming in a network without support for MAGCF functionality, the last serving MAGCF is used as a roaming anchor. However, since the IMS AS is responsible for handling all services, service execution in the MSC/VLR has to be suppressed. Preferably a mechanism to filter the subscriber data is proposed in order to prevent the MSC/VLR to handle any services. The HLR knows that a subscriber is roaming in a remote visited network. So when sending the MAP operation Insert Subscriber data, the HLR filters out all supplementary service subscriptions before sending the data to the MSC/VLR. Further it is proposed that when roaming in the home network, the subscriber data is not filtered and the MAGCF takes care to suppress the any service invocation. Another option is to filter the subscriber data also when sent in the home network to an MAGCF.

In the following a basic architecture for performing the originating call in the home network is presented in respect to FIG. 6. FIG. 6 shows a user A being the call originating user. Said user is connected over a radio access network, like UTRAN or GERAN to the MAGCF. Since the user performs a call in the home network, it is directly connected to the MSC-S part of the MAGCF node. The IMS part of the MAGCF node conveys a connection to the S-CSCF by means of the SIP protocol. In particular the integrated P-CSCF knows the address of the S-CSCF. There is also the IMS AS node communicating with the S-CSCF.

The dotted lines depict the flow of signalling messages. In FIG. 6 also MGW and MRFP nodes are depicted, which are involved in the transmission of user plane being indicated by the continuous lines.

According to FIG. 6 when the call request, step 61 is received in the MAGCF from the terminal, the MAGCF does not invoke any originating services and it also does not look at the received B-number. The MAGCF routes the call to the IMS of the served subscriber. Since the P-CSCF in the MAGCF still knows the S-CSCF from the IMS registration, the call is routed straight to the S-CSCF, step 62. In step 63, the S-CSCF involves the IMS AS for invoking originating services and analysis of the dialed B-number. The checking of the originating services might for example include barring of all outgoing calls supplementary services, which for example might be used when giving a phone to a third person then the barring service might be activated in order to prohibit said user from making a call while still allowing him to be reachable for all terminating calls.

Further the MAGCF selects a MGW for handling the user plane. The IMS AS involves an MRFP for handling the user plane. MGW and MRFP are preferably separate nodes.

In the following the message flow sequence for an originating call in a Home network is described in respect to FIG. 7. In FIG. 7 a calling user UE A originating a call to the called user B: IMS are depicted. Since the user performs a call in a home network by contacting the MSC-S function integrated in the MAGCF node, therefore the MAGCF node with the MSC-S functionality is depicted. Further there is the A: S-CSCF, which is the serving S-CSCF for the originating user, the A: IMS AS being responsible for the user. The lines depicted between two entities indicate flow of the messages and the arrows the direction of the message exchange.

In the first step of a call originating procedure the calling user, UE A sends a 24.0008: CS Service Request to the MAGCF, in particular to the MSC-S. Said node performs at first a circuit-switched authentication for the calling user as it is already known and in a subsequent step said user sends a 24.008: Setup message, which is confirmed by means of the 24.008: Call Proceeding message. As aforementioned the MAGCF knows the address of the S-CSCF being responsible for the user and therefore said address is taken to start the IMS Call setup procedure. In particular the integrated P-CSCF knows the address of the S-CSCF. In the first step SIP:Invite is sent to the S-CSCF serving the calling user A. Said message includes as parameters the telephone number of the called user B, tel-URL and the Session Description Protocol Parameters of the user A SDP A. The SDP parameters are exchanged in the frame of SDP negotiation procedure in the communication entities, which are the originating and the terminating users. During the negotiation procedure media characteristics, like for example number of media flows or codecs, are negotiated.

Returning to FIG. 7 The A: S-CSCF sends a ISC:Invite (Tel-URL, SDP A) to the A:IMS AS for invoking originating services and for analysing the dialled B-number. Upon receipt of an answer from the A:IMS AS, the A:S-CSCF sends a SIP:Invite (SIP-URL, SDP A) message to the terminating user, B:IMS. In a subsequent step the SDP negotiation procedure is started by sending the SIP:183 Session Progress (SDP B) carrying the proposed SDP parameters from the terminating user. Said message is forwarded to the MAGCF, which after contacting the responsible RAN (Radio Access Network), in order to check whether the proposed SDP parameters are supported and in order to reserve the resources required for the negotiated session parameters. This is performed by means of the messages Assignment Request and Assignment Complete. In a following step the MAGCF sends a SIP:Update message through the A:S-CSCF to the B:IMS, which agrees on the new parameters by sending the SIP:200 OK (Update) message. In case, the called user is free and able to receive the call a corresponding indication, namely the SIP: 180 Ringing is sent to the MAGCF, which translates it into circuit-switched protocol based message, namely 24.008: Alerting. After receiving the SIP:200OK (Invite) message from the called user, B:IMS a 24.008: Connect message is sent to the originating user, UE A in order to finalize the establishment procedure. A confirmation of a successful performed call setup procedure is sent to the terminating user by means of the 24.008: Connect Ack and SIP:Ack messages. After successful performed call setup procedure a voice call might be carried out.

In the following an embodiment is presented for performing an originating call in a remote visited network without support for MAGCF functionality. In this scenario, for a user roaming in this network, the last serving MAGCF is used as a roaming anchor point. As described in the previous embodiment, the HLR adds CAMEL data to the subscriber data when inserting subscriber data into the MSC/VLR, in order to enforce that the call handling is performed in the anchor MAGCF. Thus, when a call request is received, the MSC/VLR notices the CAMEL data, which causes the call to be routed to the roaming anchor MAGCF. After the call has reached the MAGCF, call setup continues as for the home network case, i.e. the call is forwarded to the S-CSCF for execution of originating services.

The originating call is presented in the following in more details in respect to FIG. 9 presenting the flow of messages. The FIG. 9 Corresponds to the FIG. 7 with the difference that in FIG. 9 additionally the MSC/VLR located in the visited network is depicted. Further in FIG. 9 the MAGCF is depicted with the gsmSCF functionality. However this should not be seen as restriction. Alternatively the gsmSCF might be provided as a separate node.

In the first step the user UE sends a 24.0008: CM Service Request message to the MSC/VLR followed by a 24.008: Setup (B Number), which are confirmed by the message 24.008: Call Processing. The receipt of the messages means for the MSC/VLR that the user wishes to establish a connection to the user with the B-Number. However during the registration procedure the MSC/VLR has received form the HLR a CAMEL message, as described in the previous embodiments, informing that the user is to be handled by the gsmSCF, Based on this information the MSC/VLR routes the call to the MAGCF over the gsmSCF. In the previous embodiment it is discussed how to route a call to a MAGCF. In this particular embodiment the routing by using a roaming number is shown. According to this approach the MSC/VLR has the address of the gsmSCF, which is also the address of the MAGCF. By means of this address the MAGCF is contacted, CAP: InitialDP(B-number). Upon receipt of this message the MAGCF performs a procedure for providing a routing number, which includes allocating of a roaming number and putting the allocated roaming number in relation to the B-number. Said roaming number is sent to the MSC/VLR by means of the CAP:Connect (Roaming Number) message in order to route the call by means of the roaming number, ISUP:IAM (Roaming Number). The rest of the procedure is similar to the steps described in respect to FIG. 7 leading to convey call originating procedure.

In the following embodiments describing a terminating call in the home network in respect to FIG. 10 is described. The structure of the FIG. 10 corresponds to the structure of FIG. 6. In step 101 the S-CSCF receives a call which is to be terminated at the user B. The S-SCCF involves the IMS AS for execution of terminating services, step 102 and 103. Herein the terminating subscriber's services are checked, in a similar way as for the originating case. For example the barring of all incoming call when roaming abroad might be activated. In this example IMS checks whether a user has a subscription to this service, and then in case said user roams abroad, the call is blocked.

The S-CSCF knows the address of the serving MAGCF from the IMS registration, as it is described in the above embodiments. In particular the address of the integrated P-CSCF is known to the S-CSCF. By means of a SIP protocol the call is forwarded to the MAGCF, in particular to the proxy gateway, P-CSCF located in the MAGCF, 104. The MAGCF terminates the call towards the terminal, however, without invocation of any service. The termination means that the IMS call is terminated in the MAGCF and converted to a CS call which is then forwarded for example by means of a 24.0008 protocol to the B user over an Access Network, like for example UTRAN or GERAN, 105. The described call terminating routing is preferably restricted to the routing of signaling information. It is proposed that the payload information is routed on a direct way via MRFP and MGW to the Access Network, as it is depicted in FIG. 6 by means of the continuous line.

The flow of messages for call terminating procedure is presented in the following in respect to FIG. 11. FIG. 11 shows an IMS user, A:IMS wishing to be connected to the user B, UE B. In a first step the I-CSCF is contacted which is responsible within an operator's network for all connections destined to a subscriber of that network operator, or a roaming user currently located within that network operator's service area. The contacting is performed by means of SIP:Invite (SIP URL, SDP A). Multiple I-CSCFs within an operator's network might be available. The main function performed by the I-CSCF is assigning a S-CSCF to a user performing SIP registration. According to the present invention the S-CSCF knows the address of the MAGCF and in particular of the P-CSCF integrated in the MAGCF and therefore the SIP:Invite might be forwarded to the MAGCF. In respect to FIG. 11 before forwarding the message to the MAGCF, the B:IMS AS is contacted by means of the 1SC:invite messages in order to terminate the IMS services. Upon receipt of the SIP:Invite(SIP-URL, SDP A) the IMS call is terminated in the MAGCF and a circuited-switched handling is initiated, including sending the 24.008: Paging message to the called user, UE B, performing the circuited-switched authentication, and establishing a call to the UE B by means of the 24.008: Call Setup and 24.008: Call Confirmed messages. The rest of the procedure is similar to the procedure described in respect to FIG. 7. This means that the IMS part located in the MAGCF, namely the P-CSCF sends a SIP: 183 Session Progress (SDP B) message to the A:IMS user with the proposed parameters. According to the FIG. 11 an update of the parameters at both communicating sides is performed by means of the SIP:Update and SIP: 200OK messages. Upon the parameters are assigned, a ringing signal occurs, 24.008: Alerting, SIP:180 Ringing, and a connecting procedure, 24.008: Connect, SIP:200OK (invite) with the confirmation messages, SIP:ACK and 24.008: Connect ACK is performed.

Of course it might happen that the calling user is located in a visited network, B visited, without MAGCF functionality. This scenario is described in the following in respect to FIG. 12 showing the terminating call for user B. In this case the IMS part of a call is to be terminated in a MAGCF being responsible for the user and acting as a roaming anchor. Thus, the terminating call is routed to the S-CSCF, 121, which then involves the IMS AS for execution of terminating services, 122 and 123. As already mentioned the S-CSCF knows the address of the serving MAGCF from the IMS registration. Thus, the call is transmitted, preferably by means of the SIP protocol to the MAGCF, 124. Said MAGCF recognizes that it works as a roaming anchor, thus when the terminating call is received in the MAGCF, the MAGCF recognizes that it cannot terminate the call directly, but has to involve the serving MSC/VLR. So the MAGCF acts as a GMSC and asks the HLR for routing information. The HLR fetches the roaming number from the serving MSC/VLR, 126 and returns it to the MAGCF, 125. The call is then routed from the MAGCF to the MSC/VLR using the roaming number, 127. It is to be noted that no services are executed in the HLR, since for the execution of said services the IMS AS is responsible. The signaling sequence is similar to the sequence described in respect to FIG. 11 with the difference that a corresponding signaling, preferably MAP based signaling is to be exchanged between the MAGCF, HLR and MSC/VLR, wherein said MSC/VLR is responsible for establishing a connection to the user B.

The above-described embodiments are based on integration of cellular-switched controlled users equipment, like it is provided in GSM or GPRS, into IMS services developed in connection with UMTS. However, the present invention is not only restricted to these networks. A further example might be CDMA2000 providing corresponding nodes as the nodes existing in GPRS or UMTS.

What is claimed is:

1. An Access Gateway Node in a home network of a circuit-switched controlled user's terminal (MS) adapted to handle a call in a packet-based multimedia system domain for the circuit-switched controlled user's terminal located in a circuit-switched controlled domain of a visited network, wherein said Access Gateway Node comprises a microprocessor coupled to a memory storing instructions that, when executed by the microprocessor, enable the Access Gateway Node to:

receive an originating circuit-switched call from the circuit-switch controlled user's terminal, via a serving Mobile Switching Center (MSC) in the visited network, at an originating circuit switched logic;

send, using SIP, an originating packet-based multimedia call from an originating packet-based multimedia logic via a proxy call session control function being part of the Access Gateway Node towards a S-CSCF of the packet-based multimedia system domain, wherein the S-CSCF is adapted to serve the user in the IMS domain and is determined by the Access Gateway Node during a registration procedure of the circuit-switched controlled user's terminal and wherein the Access Gateway Node knows an address of the S-CSCF based on the registration of the circuit-switched controlled user's terminal;

receive a terminating packet-based multimedia call from the packet-based multimedia domain, the terminating packet-based multimedia call being addressed to the proxy call session control function being part of the Access Gateway Node and being at a terminating packet-based multimedia logic, wherein the call is received from the S-CSCF determined during the registration procedure of the circuit-switched controlled user's terminal and wherein the S-CSCF knows an address of the Access Gateway Node based on the registration procedure of the circuit-switched controlled user's terminal;

send a terminating circuit-switched call from a terminating circuit-switched logic towards the circuit-switch controlled user's terminal via the serving MSC in the visited network; and convert the originating circuit-switched call into the originating packet-based multimedia call and convert the terminating packet-based multimedia call into the terminating circuit-switched call by using a conversion function.

2. The Access Gateway Node according to claim 1, wherein the Access Gateway Node includes a serving mobile circuit-switched function.

3. The Access Gateway Node according to claim 2, wherein the originating circuit switched logic is adapted to receive the originating circuit-switched call directly from the user's terminal using the serving mobile circuit-switched function.

4. The Access Gateway Node according to claim 2, wherein the terminating circuit-switched logic is adapted to send the terminating circuit-switched call directly to the user's terminal using the serving mobile circuit-switched function.

5. The Access Gateway Node according to claim 1, wherein said Access Gateway Node comprises a registration logic adapted to perform a registration procedure of the circuited-switched controlled user in the packet-based multimedia domain, wherein said registration procedure results in storing an address of a serving call session control function node in the Access Gateway Node and in providing an address of the Access Gateway Node to the serving call session control function node.

6. The Access Gateway Node according to claim 5, wherein the providing of the address of the Access Gateway Node is the providing of an address of the proxy call session control function.

7. The Access Gateway Node according to claim 1, wherein the Access Gateway Node is located in a Home Network in which the circuit-switch controlled user's terminal is located.

8. The Access Gateway Node according to claim 1, wherein the Access Gateway Node comprises a suppression function adapted to suppress the received originating circuited-switched call from being handled in the circuit-switched domain.

9. The Access Gateway Node according to claim 1, wherein the originating packet-based multimedia call is sent to a serving call session control function of the packet-based multimedia system domain.

10. The Access Gateway Node according to claim 9, wherein the serving call session control function is determined by the Access Gateway Node during a registration procedure of the circuit switched controlled user's terminal.

11. A method for handling a call for a circuit-switch controlled user's terminal located in a circuit-switch controlled domain of a visited network, wherein said call is to be handled in a packet-based multimedia domain of an Access Gateway Node in a home network of the circuit-switched controlled user's terminal, the method comprising:

performing a call originating procedure comprising:
receiving an originating circuit-switched call from the circuit-switch controlled user's terminal via a serving Mobile Switching Center (MSC) in the visited network;
converting the originating circuit-switched call into an originating packet-based multimedia call; and
sending, using SIP, the originating packet-based multimedia call via an integrated proxy call session control function towards a S-CSCF of the packet-based multimedia domain, wherein the S-CSCF is adapted to serve the user in the IMS domain and is determined by the Access Gateway Node during a registration procedure of the circuit-switched controlled user's terminal and wherein the Access Gateway Node knows an address of the S-CSCF based on the registration of the circuit-switched controlled user's terminal; and performing a call terminating procedure comprising:
receiving from the packet-based multimedia domain a terminating packet-based multimedia call being addressed to the integrated proxy call session control function, wherein the call is received from the S-CSCF determined during the registration procedure of the circuit-switched controlled user's terminal and wherein the S-CSCF knows an address of the Access Gateway Node based on the registration procedure of the circuit-switched controlled user's terminal;
converting the terminating packet-based multimedia call into a terminating circuit-switched call; and
sending the terminating circuit-switched call towards the circuit-switch controlled user's terminal via the serving MSC in the visited network.

12. The method according to claim 11, wherein the received originating circuited-switched call is suppressed in the Access Gateway Node from being handled in the circuit-switched domain.

13. The method according to claim 11, wherein performing the call terminating procedure further comprises terminating the received terminating packet-based multimedia call in the Access Gateway Node.

14. The method according to claim 11, wherein the receiving of the originating circuit-switched call from the circuit-switch controlled user's terminal is performed by a serving mobile circuit-switched function being part of the Access Gateway Node.

15. The method according to claim 11, wherein the sending of the terminating circuit-switched call towards the circuit-switch controlled user's terminal is performed by a serving mobile circuit-switched function being part of the Access Gateway Node.

16. The method according to claim 11, wherein the originating packet-based multimedia call is sent to a serving call session control function of the packet-based multimedia system domain.

17. The method according to claim 16, wherein the serving call session control function is determined by the Access Gateway Node during a registration procedure of the circuit switched controlled user's terminal.

* * * * *

UNITED STATES PATENT AND TRADEMARK OFFICE
CERTIFICATE OF CORRECTION

PATENT NO. : 9,544,338 B2
APPLICATION NO. : 14/487275
DATED : January 10, 2017
INVENTOR(S) : Witzel et al.

Page 1 of 2

It is certified that error appears in the above-identified patent and that said Letters Patent is hereby corrected as shown below:

On the Title Page

Item (56), under "OTHER PUBLICATIONS", in Column 2, Line 4, delete "Circuite" and insert -- Circuit --, therefor.

In the Specification

In Column 1, Line 8, delete "2011," and insert -- 2011, and now Pat. No. 8,855,105, --, therefor.

In Column 1, Line 12, delete "2009," and insert -- 2009, and now Pat. No. 8,542,672, --, therefor.

In Column 1, Lines 22-23, delete "UMTS (Universal Telecommunication Network)" and insert -- UMTS (Universal Mobile Telecommunication System) --, therefor.

In Column 3, Line 35, delete "comprising" and insert -- comprising: --, therefor.

In Column 3, below Line 57, insert Heading -- BRIEF DESCRIPTION OF THE DRAWINGS --.

In Column 3, Line 67, delete "invention, and" and insert -- invention, --, therefor.

In Column 4, Line 22, delete "network," and insert -- network, and --, therefor.

In Column 4, below Line 24, insert Heading -- DETAILED DESCRIPTION OF THE INVENTION --.

In Column 4, Lines 41-42, delete "GPRS (General Packet Switched Radio)" and insert -- GPRS (General Packet Radio Service) --, therefor.

In Column 4, Lines 42-43, delete "UMTS (Universal Mobile Telephone System)" and insert -- UMTS (Universal Mobile Telecommunication System) --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,544,338 B2

In Column 4, Line 64, delete "MGCF" and insert -- MAGCF --, therefor.

In Column 6, Line 45, delete "Org CS," and insert -- Orig CS, --, therefor.

In Column 10, Line 20, delete "Fig. 5 Similar" and insert -- Fig. 5, similar --, therefor.

In Column 12, Line 8, delete "Fig. 7 The" and insert -- Fig. 7, the --, therefor.

In Column 12, Line 66, delete "form the" and insert -- from the --, therefor.

In Column 13, Line 23, delete "S-SCCF" and insert -- S-CSCF --, therefor.

In Column 13, Line 65, delete "1SC: invite messages" and insert -- ISC: invite messages --, therefor.